Figure 1:
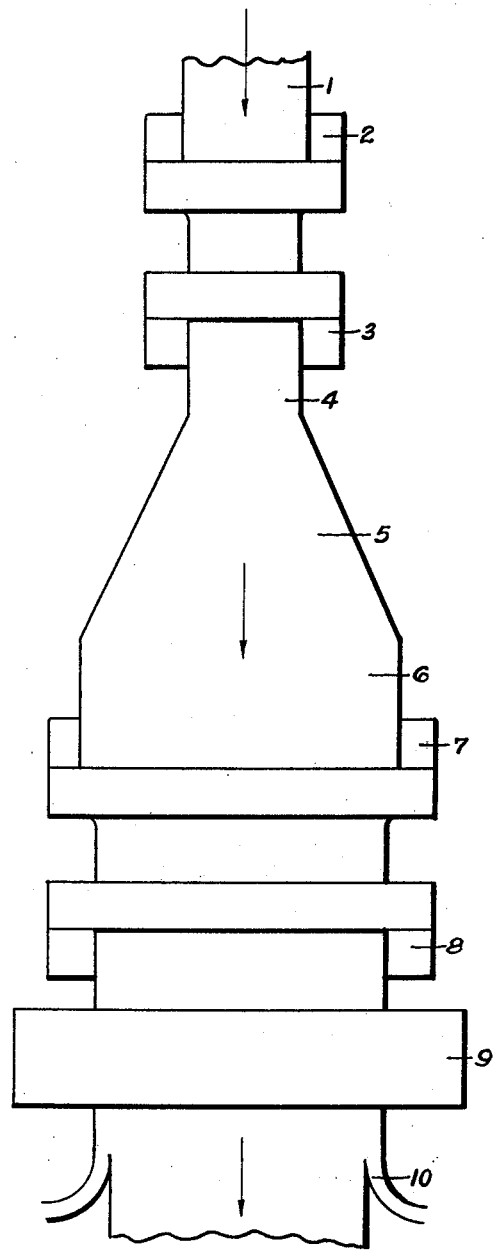

April 6, 1965    J. F. E. ADAMS ETAL    3,177,277
PROCESS FOR THE PRODUCTION OF BIAXIALLY ORIENTED
POLYETHYLENE TEREPHTHALATE FILM
Filed May 10, 1957    2 Sheets-Sheet 2

INVENTORS
JOHN FRANCIS EDWARD ADAMS
KENNETH GEORGE GERBER
WILLIAM ANTHONY HOLMES-WALKER

BY Cushman, Darby + Cushman
ATTORNEYS 3,177,277
PROCESS FOR THE PRODUCTION OF BIAXIALLY ORIENTED POLYETHYLENE TEREPHTHALATE FILM
John Francis Edward Adams and Kenneth George Gerber, Welwyn Garden City, and William Anthony Holmes-Walker, Boxmoor, England, assignors to Imperial Chemical Industries Limited, London, England, a corporation of Great Britain
Filed May 10, 1957, Ser. No. 658,298
Claims priority, application Great Britain, May 18, 1956, 15,548/56
8 Claims. (Cl. 264—210)

This invention relates to orientable films of organic thermoplastic material.

It is well known that the physical properties of orientable films of organic thermoplastic materials, particularly their tensile strength, may be improved by stretching to introduce orientation, and that such stretched films may be stabilised against shrinkage by causing them to crystallise after stretching, generally by heating them to a temperature considerably above that at which they were stretched. This latter step is generally known as heat setting.

For some uses it is desirable for such films to have a tensile strength in one direction that is high in comparison with the strength in any one direction of a film of the same material and thickness having balanced biaxial orientation, and at the same time to have adequate tensile strength in the direction at right angles to the direction of higher tensile strength.

It has previously been proposed to produce a film having a higher strength in one direction by drawing the film to orient it in one direction only, or by forming a biaxially oriented film in which the draw ratio in one direction is higher than in the other. It has been found, however, that the first of these methods gives film that has unsatisfactory properties in the direction at right angles to the direction of orientation, the film being brittle and having a tendency to fibrillate when handled. In the second method, either the greater amount of orientation is introduced first, in which case the film is found to split when an attempt is made to draw it in the direction at right angles, or the smaller amount of orientation is introduced first, in which case the drawing operation is found to be unstable and to produce film with wide thickness variations. If, in the last mentioned method, enough orientation is introduced in the first direction to give stable drawing conditions, it is found to be impossible to draw the film in the direction at right angles to the high draw ratio required, because the film breaks. Each of these previously tested methods thus results in the production of a film having generally unsatisfactory properties or having inadequate tensile strength in the direction at right angles to the direction of major orientation.

It is therefore an object of this invention to provide a process for the production of oriented film that combines a relatively high tensile strength in one direction with a tensile strength in the direction transverse thereto that is sufficient for the film to withstand normal handling. It is a further object to provide a process for the production of heat set films having such properties.

In accordance with the present invention, a film of an organic thermoplastic material that has been biaxially oriented is further drawn along one axis only, said axis being one of the axes of the previous orientation. By this process a high tensile strength is introduced into the film in the direction in which it has been twice drawn.

The term "drawing" is used throughout this specification to describe the well known stretching of the film to introduce molecular orientation. The initial biaxial orientation may be introduced by drawing the substantially amorphous film in two directions at right angles to each other, either simultaneously or consecutively in either order. The film may be heat set either before or after the further drawing process is applied to the biaxially oriented film. It is preferred, however, that it be applied after this process, since high drawing temperatures are otherwise required for the final drawing step. Conventional heat setting methods may be used.

During the drawing process of the invention, partial shrinkage of the film in the direction at right angles to the direction of drawing may be allowed. Whilst there is some loss of orientation and tensile strength in this direction, particularly if a relatively large amount of shrinkage occurs, sufficient orientation remains to give the finished film adequate properties in this direction.

The process of the present invention is particularly useful for the production of oriented films of polyethylene terephthalate, since this material is capable of being formed into films of exceptionally high tensile strength. In the application of the process to films of this material it is preferred that a substantially amorphous film be first drawn in two directions at right angles to each other to a draw ratio of from 2:1 to 5:1 in each direction (the draw ratios in the two directions being the same or different) and that it thereafter be further drawn to a ratio of from 1.05:1 to 4:1 in that direction in which the greater strength is required. Particularly useful films are obtained by first drawing to a ratio of 2.5:1 to 4:1 in both directions (again either equally or unequally in the two directions) and thereafter further drawing to a ratio of 1.5:1 to 3:1 in the direction in which the greater strength is required. By these processes polyethylene terephthalate films may be obtained that have a more useful combination of tensile strength in the two directions than any previously known films of this material; they may in fact have a break point of at least 40,000 p.s.i. in one direction combined with a break point of at least 8,000 p.s.i. in the direction at right angles thereto.

The initial biaxial orientation may, as stated above, be introduced by drawing the film in two directions at right angles to each other either simultaneously or consecutively. When the film is drawn consecutively in the two directions it is preferred that it be drawn first in the direction in which the greater amount of orientation is desired in the finished film, which is usually the machine direction. When polyethylene terephthalate film is drawn in this way it is preferably drawn first in this direction at a temperature of from 70° to 90° C., then in the direction at right angles thereto at a temperature of from 80° to 90° C., and finally in the first direction again, at a temperature of 100° to 220° C. When the polyethylene terephthalate film is biaxially drawn in both directions simultaneously, this is preferably carried out at a temperature of 70° to 120° C. and followed by the further drawing step, in the direction in which greater orientation is required, at a temperature of 80° to 200° C. The film may in each case be heat set, preferably at a temperature of 150° to 230° C., before or after the final drawing operation, but preferably after it.

Any of the known methods for drawing films may be used in the process of this invention. In the case of flat film required to have greater strength in the machine direction it is usually easier to introduce the initial biaxial orientation by one of the known two-step processes, first longitudinally and then transversely, by any of the known methods, and then to draw the film again longitudinally, for example by means of two pairs of nip rollers, the second pair of which are driven at a peripheral speed greater than that of the first pair. In the case of tubular film it is preferred to draw the film initially in both directions at once, by means of a bubble of pressurised fluid held within the film between two pairs of nip rolls appropriately driven at different peripheral speeds, and then to draw the film again longitudinally by enclosing a second bubble of fluid under such pressure that a limited amount of transverse shrinkage is allowed, and drawing the film forward by a third pair of nip rolls driven at a peripheral speed greater than that of the second pair. The final step may alternatively be carried out with the film in a partially deflated condition, allowing a considerable amount of transverse shrinkage, with the application of a positive longitudinal drawing tension.

Figure 2:
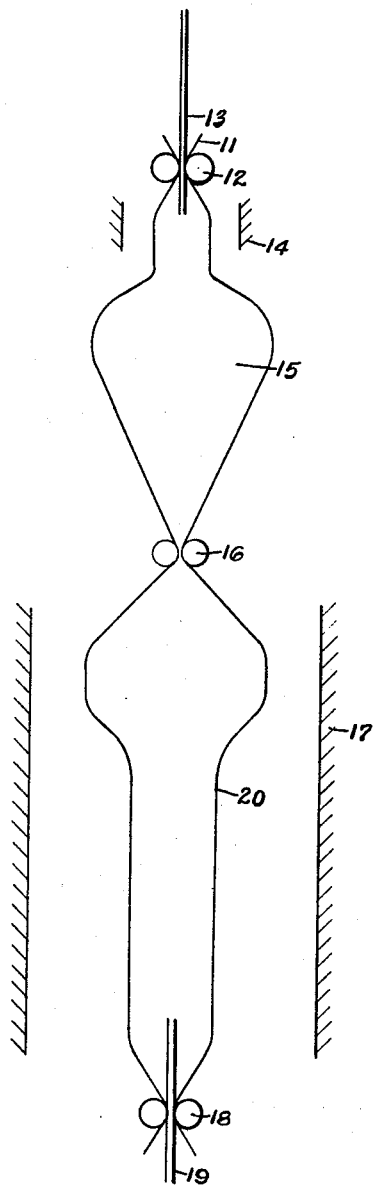

Such methods of drawing films in accordance with the present invention are illustrated diagrammatically in the accompanying drawings, in which:

FIGURE 1 shows a system used for drawing flat film, the initial biaxial orientation being introduced in two stages and FIGURE 2 shows a system for drawing tubular film, the initial biaxial orientation being introduced in a single stage.

In FIGURE 1, 1 represents a length of substantially amorphous film advancing to a drawing system comprising slow rolls, 2, and fast rolls, 3, between which the film is drawn in the machine direction to a desired initial draw ratio. From the fast rolls 3 the forward drawn film passes to a stenter at 5, where it is drawn in the sideways direction. From the stenter the biaxially oriented film, 6, passes to a pair of rolls, 7, which are the slow rolls of a forward drawing system used to carry out the drawing process with which the present invention is particularly concerned. Thus, the biaxially oriented film is further drawn in the machine direction, to the desired final draw ratio, between these rolls and the fast rolls, 8, of the system. The preferentially drawn film then passes through a heat setting oven, 9, to an edge trimming device, 10, and the trimmed film is finally wound. For each drawing step included in this process, the film may be heated to the desired drawing temperature in any known manner.

In FIGURE 2, 11 represents the tubular film advancing from a cooling device after extrusion and passing between the nip rolls, 12, which are grooved to carry a tubular probe, 13, through which air may be introduced into the tubular film. 14 is a heater which heats the film to the drawing temperature, at which it is stretched transversely to the required extent, as shown at 15, by the pressure of air introduced through the probe. Longitudinal stretching is brought about simultaneously by means of the nip rolls, 16, which are rotated at a peripheral speed sufficiently greater than that of the rolls 12 for the required draw ratio to be obtained. After passing through the nip rolls, 16, the film is again heated, by means of the heater 17, and is further stretched longitudinally by means of a third pair of nip rolls, 18, rotating at a peripheral speed calculated to produce the draw ratio required. Air pressure, introduced through the tubular probe 19, is regulated to allow partial shrinkage of the film in the transverse direction, as shown at 20. Beyond the drawing region heating of the film by the heater 17 is continued, and this serves to heat set the film. Immediately after passing between the nip rolls, 18, the film is slit into two continuous lengths of equal width, which are separately wound.

It will be appreciated that the drawings are for purposes of illustration only, and that other known methods of drawing the film may be used. Many modifications may also be made in the methods particularly described. For example, the tubular film may as already stated be drawn separately in the two directions to introduce the initial biaxial orientation, and may be heat set in an operation completely separate from the final drawing step.

Apart from their excellent breaking strength, the films produced by the process of this invention have a lower elongation before break in the direction of maximum strength than balanced biaxially oriented films, and this is an advantage for many applications. For example, the polyethylene terephthalate films of the invention may have an elongation before break of no more than 20% in the direction of maximum strength, generally of the order of 10 to 40%, compared with an elongation before break of the order of 80 to 150% for balanced biaxially oriented films.

The oriented films produced by the process of this invention are useful wherever a film is required to have a particularly high strength in one direction combined with adequate strength in the direction transverse thereto. Such applications include, for example: photographic film base; magnetic recording tapes; packaging tapes and braids; adhesive tape; belting and webbing; electrical tapes; decorative yarns; and strands for chair upholstery, basket manufacture and the like.

One particularly valuable use of the film is for photographic film base that is required to be very thin, yet to have adequate tensile properties; for example, the polyethylene terephthalate film of the invention is particularly suitable for use as a base for cinematograph films, and also for use as a base for films used in cut or roll form in amateur photography, colour photography, X-ray diagnosis, sound recording and the copying of documents.

Our invention is illustrated but in no way limited by the following examples, in which reference is made to the table following them. In this table the properties of the film of each example are compared with those of a polyethylene terephthalate film, Sample A, prepared by drawing the film in the machine direction only to a high draw ratio, and a film, Sample B, which had been biaxially oriented by a conventional two-stage method.

EXAMPLE 1

Flat amorphous polyethylene terephthalate film was drawn forwards over a heated roll to a ratio of 2½:1 at a temperature of 85° C. and a speed of 5 ft. per minute. The film was then drawn sideways to a ratio of 3¼:1, in a water bath at 85° C. and at a speed of 10 ft. per minute. Finally the film was drawn forwards again, to a ratio of 2¼:1, over a roll at 150° C. and at a speed of 5 ft. per minute.

EXAMPLE 2

Flat amorphous polyethylene terephthalate film was drawn forwards to a ratio of 3:1 under an infra-red heater, at a constant temperature estimated to be between 75° and 90° C., and at a speed of 4½ ft. per minute. The film was then drawn sideways in a water bath at 90° C. to a ratio of 3¼:1; was then passed under tension through a heat-setting oven at 200° C.; and was finally drawn forwards to a ratio of 1¾:1, under an infra-red heater, at a constant temperature between 100 and 150° C.

EXAMPLE 3

Tubular amorphous film of polyethylene terephthalate was drawn forwards and sideways simultaneously to ratios of 3⅓:1 to 3¾:1 respectively, while heated by an infra-red heater to a temperature estimated to be between 90 and 120° C., at a speed of 10 ft. per minute. The film was then passed into a zone similarly heated to a temperature between 120 and 160° C., and was drawn forwards to a ratio of 1½:1 at this temperature. During this latter forward draw the air pressure in the bubble was adjusted so that the width of the film was reduced from 22" to 10".

EXAMPLE 4

The process of Example 3 was repeated except that the final draw ratio was 1¾:1 and the film was shrunk to a width of 16".

Table

| Sample made by method of Example No. | Draw Ratio | | | Amorphous film thickness, inches | Final drawn film thickness, inches | Machine Direction Strength (p.s.i.×10⁻³) | | Elongation to break, percent | Transverse Direction Strength (p.s.i.×10⁻³) | | Elongation to break, percent |
|---|---|---|---|---|---|---|---|---|---|---|---|
| | Forward | Sideways | Forward | | | Yield | Break | | Yield | Break | |
| A | 5 | | | 0.006 | 0.0012 | 50 | 60 | 30 | (¹) | | |
| B | 3 | 3¼ | | 0.050 | 0.0050 | 13 | 22 | 180 | 14 | 23 | 130 |
| 1 | 2½ | 3¼ | 2¼ | 0.012 | 0.0018 | 30 | 56 | 55 | 10 | 12 | 300 |
| 2 | 3 | 3¼ | 1¾ | 0.045 | 0.0038 | 44 | 50 | 35 | 9 | 13 | 200 |
| 3 | 3¼ | 3¾ | 1½ | 0.013 | 0.0008 | 52 | 55 | 12 | 8 | | 300 |
| 4 | 3⅛ | 3¾ | 1¼ | 0.013 | 0.0009 | 37 | 51 | 35 | 12 | 22 | 205 |

¹ Shattered in testing machine.

We claim:

1. A process comprising the steps of extruding molten highly polymeric polyethylene terephthalate in film form, cooling the extruded film to convert it to the solid, substantially amorphous form, biaxially orienting the solidified film by stretching it laterally and longitudinally, the degree of stretch in each direction being within the range of from about 2:1 to about 5:1, heat setting the biaxially oriented film, and thereafter further stretching the film in one such direction in which greater strength is required at a temperature of from 100° to 220° C., the degree of such further stretch being about 1.5:1.

2. A process as defined in claim 1, in which during the further stretching of the film partial shrinkage of the film is permitted in the direction transverse to the direction of said further stretching.

3. A process as defined in claim 1, wherein the lateral and longitudinal stretching producing the biaxial orientation are performed simultaneously.

4. A process as defined in claim 1, wherein the lateral and longitudinal stretching producing the biaxial orientation are performed consecutively, the film being first stretched in the direction in which greater strength is required.

5. A process comprising the steps of extruding molten highly polymeric polyethylene terephthalate in film form, cooling the extruded film to convert it to the solid, substantially amorphous form, biaxially orienting the solidified film by stretching it laterally and longitudinally, the degree of stretch in each direction being within the range of from about 2:1 to about 5:1, heat setting the biaxially oriented film at a temperature of from 150° to 230° C., and thereafter further stretching the film in one such direction in which greater strength is required at a temperature of from 100° to 220° C., the degree of such further stretch being within the range of from about 1.05:1 to about 4:1.

6. A process comprising the steps of extruding molten highly polymeric polyethylene terephthalate in film form, cooling the extruded film to convert it to the solid, substantially amorphous form, biaxially orienting the solidified film by stretching it laterally and longitudinally, the degree of stretch in each direction being within the range of from about 2.5:1 to about 4:1, heat setting the biaxially oriented film, and thereafter further stretching the film in one such direction in which greater strength is required, the degree of such further stretch being within the range of from about 1.5:1 to about 3:1.

7. A process comprising the steps of extruding molten highly polymeric polyethylene terephthalate in film form, cooling the extruded film to convert it to the solid, substantially amorphous form, biaxially orienting the solidified film by stretching it laterally and longitudinally, the degree of stretch in each direction being within the range of from about 2.5:1 to about 4:1, heat setting the biaxially oriented film at a temperature of from 150° to 230° C., and thereafter further stretching the film in one such direction in which greater strength is required, the degree of such further stretch being within the range of from about 1.5:1 to about 3:1.

8. A process comprising the steps of extruding molten highly polymeric polyethylene terephthalate in film form, cooling the extruded film to convert it to the solid, substantially amorphous form, biaxially orienting the solidified film by stretching it laterally and longitudinally, the degree of stretch in each direction being within the range of from about 2.5:1 to about 4:1, heat setting the biaxially oriented film, and thereafter further stretching the film at a temperature of from 100° to 220° C. in one such direction in which greater strength is required, the degree of such further stretch being within the range of from about 1.5:1 to about 3:1.

References Cited by the Examiner

UNITED STATES PATENTS

| | | | |
|---|---|---|---|
| 2,219,700 | 10/40 | Perrin et al | 260—94 |
| 2,230,000 | 1/41 | Hauffle et al. | 260—42 |
| 2,255,940 | 9/41 | Rogers. | |
| 2,290,180 | 7/42 | Hershberger | 260—36 |
| 2,578,899 | 12/51 | Pace. | |
| 2,627,088 | 2/53 | Alles et al. | 18—47.5 |
| 2,668,988 | 2/54 | Bailey et al. | |
| 2,763,029 | 9/56 | Tulloss | 18—47.5 |
| 2,823,421 | 2/58 | Scarlett. | |
| 2,851,733 | 9/58 | Pangonis et al. | |
| 2,884,663 | 5/59 | Alles. | |

FOREIGN PATENTS

| | | |
|---|---|---|
| 522,077 | 8/53 | Belgium. |
| 743,497 | 1/56 | Great Britain. |

ALEXANDER H. BRODMERKEL, *Primary Examiner.*

MICHAEL V. BRINDISI, *Examiner.*